US010206259B2

(12) United States Patent
Burmeister et al.

(10) Patent No.: US 10,206,259 B2
(45) Date of Patent: Feb. 12, 2019

(54) LUMINAIRE AND METHOD FOR PRESENCE DETECTION BY MEANS OF SAME

(71) Applicant: Eaton Protection Systems IP GmbH & Co. KG, Schonefeld (DE)

(72) Inventors: Jens Burmeister, Eberbach (DE); Toni Ott, Neckargemund (DE)

(73) Assignee: EATON PROTECTION SYSTEMS IP GMBH & CO. KG, Schonefeld (DE)

( * ) Notice: Subject to any disclaimer, the term of this patent is extended or adjusted under 35 U.S.C. 154(b) by 0 days.

(21) Appl. No.: 15/507,501

(22) PCT Filed: Sep. 4, 2015

(86) PCT No.: PCT/EP2015/001793
§ 371 (c)(1),
(2) Date: Feb. 28, 2017

(87) PCT Pub. No.: WO2016/034290
PCT Pub. Date: Mar. 10, 2016

(65) Prior Publication Data
US 2017/0295621 A1    Oct. 12, 2017

(30) Foreign Application Priority Data

Sep. 4, 2014    (DE) .................. 10 2014 013 148

(51) Int. Cl.
*F21V 7/04*    (2006.01)
*F21V 29/70*    (2015.01)
(Continued)

(52) U.S. Cl.
CPC ....... *H05B 33/0854* (2013.01); *F21V 7/0008* (2013.01); *F21V 7/04* (2013.01);
(Continued)

(58) Field of Classification Search
CPC .... H05B 33/08; H05B 33/0854; H05B 37/02; H05B 37/0218; F21V 19/003; F21V 29/70; F21V 7/04; F21Y 2103/10
See application file for complete search history.

(56) References Cited

U.S. PATENT DOCUMENTS 6,102,552 A * 8/2000 Tullis .................. G02B 27/09
                                              362/235
9,799,184 B2 * 10/2017 Chen .................. H05B 33/0854
(Continued)

FOREIGN PATENT DOCUMENTS

| DE | 202013101827 | 9/2014 |
| GB | 2499002 | 8/2013 |
| WO | WO2013057644 | 4/2013 |

OTHER PUBLICATIONS

Krikorian, Oliver, International Search Report issued in application No. PCT/EP2015/001793, completion date Oct. 30, 2015, dated Nov. 6, 2015, 4 pages, European Patent Office, Netherlands.
(Continued)

*Primary Examiner* — Thai Pham
(74) *Attorney, Agent, or Firm* — King & Spalding LLP (57) ABSTRACT

A luminaire according to the invention has at least a number of illuminants and a reflection apparatus deflecting light radiation emitted by the illuminants into an illumination region, wherein a presence detection apparatus is assigned to the luminaire. In order to improve the control of every luminaire in view of the presence of a person and in order to further reduce the energy consumption, the reflection apparatus is, at least at points, embodied as a detection-reflection apparatus and electromagnetic detection radiation in particular is deflectable in the direction of the presence detection apparatus by way of the detection-reflection apparatus. The presence detection apparatus is arranged adjacent to the illuminants in the luminaire. The invention likewise
(Continued)

relates to a method for presence detection, wherein electromagnetic detection radiation in particular is deflected in the direction of the present detection apparatus by way of a detection-reflection apparatus.

20 Claims, 4 Drawing Sheets

(51) Int. Cl.
*H05B 33/08* (2006.01)
*H05B 37/02* (2006.01)
*F21V 7/00* (2006.01)
*F21V 23/04* (2006.01)
*F21V 19/00* (2006.01)
*F21Y 103/10* (2016.01)
*F21Y 115/10* (2016.01)

(52) U.S. Cl.
CPC ........ *F21V 19/003* (2013.01); *F21V 23/0471* (2013.01); *F21V 29/70* (2015.01); *H05B 37/0218* (2013.01); *F21Y 2103/10* (2016.08); *F21Y 2115/10* (2016.08)

(56) References Cited

U.S. PATENT DOCUMENTS

| | | |
|---|---|---|
| 2011/0277361 A1 | 11/2011 | Nichol et al. |
| 2013/0314004 A1 | 11/2013 | Harbers et al. |
| 2014/0001963 A1* | 1/2014 | Chobot ................. H05B 37/02 |
| | | 315/153 |

OTHER PUBLICATIONS

Machine translation of DE202013101827, via Lexis Nexis Total Patent, Feb. 28, 2017, 6 pages.

* cited by examiner

LUMINAIRE AND METHOD FOR PRESENCE DETECTION BY MEANS OF SAME

PRIORITY CLAIM

The present application is a national phase application of and claims priority to International Application No. PCT/EP2015/001793 with an International filing date of Sep. 4, 2015, which claims priority to German Patent Application No. 10 2014 013 148.3, filed on Sep. 4, 2014. The foregoing applications are hereby incorporated herein by reference.

TECHNICAL FIELD

The invention relates to a luminaire having at least a number of illuminants and a reflection apparatus deflecting light radiation emitted by the illuminants into an illumination region. Furthermore, a presence detection apparatus is assigned to the luminaire.

BACKGROUND

A luminaire may be part of an illumination system which is for instance arranged within a building. At night or in the case of merely low-light ambient illumination, such a luminaire is turned on and outputs light, wherein the light output can lead by way of the presence detection apparatus to a reduced light output if no persons are present. This will lower the energy consumption, especially in cases where otherwise such a luminaire is operated at full power, for instance at night. A corresponding presence detection apparatus can be arranged within a region to be illuminated and can transmit signals to a control device, so that in the presence of a person the light output of the corresponding luminaire or corresponding luminaires is not reduced.

As a rule, such a presence detection apparatus is provided for a specific area of a building, for instance a room or the like, so that a number of luminaires are correspondingly controlled by the presence detection apparatus. As a rule, this results in only one control of a plurality of such luminaires with respect to the presence of a person, so that this plurality of luminaires is switched on, switched off or at least dimmed accordingly.

Therefore, the energy consumption can only be reduced to a certain degree.

SUMMARY

It is the object of the invention to improve the control of each luminaire with respect to the presence of a person and to further lower energy consumption.

This object is achieved by the features of patent claim 1 and by the corresponding method features according to patent claim 16.

According to the invention the reflection apparatus of the luminaire is, at least at points, embodied as a detection-radiation reflection apparatus and electromagnetic detection radiation is deflectable in the direction of the presence detection apparatus, wherein the presence detection apparatus is arranged adjacent to the illuminants in the luminaire.

A detection of the presence of a person is thereby carried out by each luminaire per se and by way of the already existing reflection apparatus which deflects the corresponding electromagnetic detection radiation in the direction of the presence detection apparatus. External devices for presence detection are not needed and other modifications of the luminaire are also essentially missing, for instance the arrangement of separate detection-radiation reflection apparatuses in addition to the already existing reflection apparatuses.

Each luminaire is thus separately controllable in its light output with respect to the presence of a person. At the same time the luminaire does also not have a substantially changed structure in relation to a luminaire without presence detection apparatus.

BRIEF DESCRIPTION OF THE DRAWINGS

Advantageous embodiments of the invention will be explained in more detail hereinafter with reference to the figures attached in the drawing.

DETAILED DESCRIPTION OF EXAMPLE EMBODIMENTS

The presence detection apparatus is simply integrated into the corresponding luminaire. If the presence of a person is then detected by the same by way of the reflection apparatus and the detection-radiation reflection apparatus, respectively, the light output of the luminaire will be varied. This can for instance be carried out such that in the case of dark ambient illumination or at night the light output is increased after detection of the presence of a person, whereas in the absence of a person the light output can be reduced considerably or interrupted. The corresponding electromagnetic detection radiation is simply deflected inversely in relation to the light radiation via the reflection apparatus and particularly via the detection-radiation reflection apparatus formed thereby, in the direction of the presence detection apparatus.

With a corresponding configuration of at least a part of the reflection apparatus as a detection-radiation reflection apparatus, the presence of the person is substantially detected in the illumination region or at least in a section of the illumination region.

To be able to arrange the presence detection apparatus in a simple way together with the illuminants, both may be jointly arranged on a carrier. Said carrier is arranged at a corresponding place of the luminaire. Moreover, in this connection, illuminants and presence detection apparatus are jointly exchangeable and are for instance replaceable by other illuminants or other presence detection apparatus. In this connection it is possible that use is made not only of one carrier per luminaire, but that for instance two or more of these carriers are used with corresponding devices for a luminaire.

According to the invention a reduction of the light output is easily possible if no person enters the corresponding illumination region of the luminaire. However, if a person enters that region, the presence detection apparatus detects said person and controls the luminaire in a way that the light output is maximal or at least sufficient, so that the person can move or work and an adequate illumination level is present for this purpose.

In this connection, it should further be noted that a lowering of the light output or even an interruption of the light output normally also prolongs the life of the illuminants because these are used less in time or work at an at least reduced light output at lower temperatures and lower current intensities.

To cool particularly the illuminants in a simple manner, the carrier may be designed as a heat sink or arranged on a heat sink. The corresponding carrier is easily mountable on said heat sink, or in the case of a one-part design of carrier and heat sink it can be easily arranged in the luminaire.

A simple implementation of a carrier can be seen in that said carrier extends in strip form in the luminaire length direction of the luminaire. Several illuminants are for instance arranged along the carrier, so that a uniform lighting of the illumination region is possible by way of the luminaire. Inversely, this arrangement of the carrier serves the uniform detection of a person by means of the presence detection apparatus and the corresponding detection-radiation reflection apparatus.

Different luminaires are useable as illuminants; lately, the illuminants have often been LEDs. In this connection the carrier is for instance an LED printed circuit board. Plural LEDs are arranged spaced apart from one another on said printed circuit board. Furthermore, corresponding control electronics for the LEDs and also the presence detection apparatus may be arranged on the LED printed circuit board. A simple embodiment of such a presence detection apparatus can be seen in the configuration of said apparatus in the form of one, two or more presence sensors. It is here possible to arrange a presence sensor between neighboring LEDs and to supply the sensor with electricity also via the LED printed circuit board and to pick up corresponding signals from the presence sensor. It is of course possible to arrange also a plurality of such presence sensors on an LED printed circuit board.

If substantially the whole reflection apparatus is also designed as a detection-radiation reflection apparatus, a detection sensing region substantially corresponds to the illumination region. However, it may also be regarded to be enough if the detection sensing region is only present in edge regions of the illumination region, so that by analogy also the reflection apparatus is only configured in special regions to match said edge regions of the illumination region as a detection-radiation reflection apparatus. Therefore, it is further possible to provide not only one fixed detection sensing region, but two, three or more detection sensing regions are configured separately from one another in the corresponding illumination region.

To obtain a sufficient light output also in a larger illumination region, it may turn out to be advantageous when the luminaire is of a symmetrical structure with respect to the longitudinal axis of the luminaire, so that for instance corresponding LED printed circuit boards, reflection apparatuses, heat sinks or the like are arranged at both sides with respect to the longitudinal axis of the luminaire. In this connection the heat sink may also be a corresponding one-part structure and in symmetry with the luminaire length direction.

There is further the possibility that particularly for the prevention of glare or the like there is no direct light output by the illuminants, but only via reflection on the reflection apparatus. By analogy there is also no direct reception of the detection radiation, but only via the detection-radiation reflection apparatus.

In this context, too, these may be configured and/or arranged in symmetry with the luminaire length direction.

For improved reflection, particularly of the electromagnetic detection radiation, it can be considered to be advantageous if the reflection apparatus optionally comprises differently shaped reflection regions, of which a first one reflects light of the illuminants and a second one the electromagnetic detection radiation. Thus, the various reflection regions can be optimally matched to light and detection radiation, respectively.

Such a different configuration of the reflection regions can for instance be carried out in that at least the reflection regions reflecting the electromagnetic detection radiation have a dichroic coating.

Presence detection can be performed in different ways. It is for instance possible to detect presence actively with electromagnetic waves in the form of a Doppler radar or with ultrasound. A simple option can be seen in that the electromagnetic detection radiation is infrared radiation. Especially with persons or also with other creatures the presence is detectable by way of infrared radiation, so that corresponding infrared sensors can be used as presence detection apparatus. These are comparable in their size with LEDs, so that they can be arranged in a simple manner on the corresponding LED printed circuit board or the corresponding carrier together with the LEDs.

The structure of the luminaire can be simplified in that the reflection apparatus is arranged within a luminaire housing or at least parts of a luminaire housing.

For the evaluation of the detection radiation detected by the presence detection apparatus, a corresponding electronic evaluation unit is of advantage. This unit may directly be a part of the luminaire electronics and may for instance also be arranged on the LED printed circuit board. It is also conceivable that the corresponding electronic evaluation unit is implemented by way of software by a corresponding control part of the luminaire.

In LEDs it turns out to be a further advantage that these are easily switchable between different power levels to increase or lower the light output accordingly. In LEDs this is normally easier than for instance in discharge lamps. Furthermore, such LEDs require relatively little energy at a high light output. In LEDs it is further of advantage in this context that when these are reduced in their light output in the absence of a person, the lifetime of the LEDs will thus increase by comparison with LEDs that are always operated at a relatively high light output.

The luminaire according to the invention is advantageously useable also as an emergency luminaire in an emergency lighting system. In such an emergency lighting system it further turns out to be advantageous when an ambient light sensor is assigned to a luminaire or several luminaires. This can also be done in other luminaires, i.e. not only in emergency light luminaires of an emergency lighting system.

In the emergency lighting mode, such emergency luminaries will only be activated if there is not enough ambient light and the emergency luminaires are needed to guide a person to an emergency exit or the like. The corresponding ambient light sensor ensures in this connection that for instance in daylight and at a high level of the ambient light the emergency luminaires are turned off and are not operated in the emergency lighting mode. This leads to lower energy consumption as long as there is enough ambient light.

In this context, however, it may also be beneficial when the emergency luminaires are switched on via the presence detection apparatus even in daylight or sufficient ambient light to improve escape route guidance or the like in the presence of a person. Moreover, an emergency luminaire can also be dimmed or switched off by the presence detection apparatus in the case of low ambient brightness if no person is present in the corresponding illumination region of the respective luminaire.

In addition, in connection with the presence detection apparatus there is the option to control a plurality of luminaires for instance via a central control device in such a manner that these so to speak provide a chaser light for a moving person, so that the very region that in the movement direction of the corresponding person is ahead of said person is always illuminated. This means that the regions behind the person, i.e. regions out of which the person moves away, can already be switched to dark again by way of the central monitoring of the various presence detection apparatuses, whereas regions located in front of the person, i.e. located in movement direction, are switched to bright. It is thereby also optionally possible to implement a specific escape route in that for instance luminaires along a specific escape route are switched on one after the other to guide the person along said escape route.

As soon as the person has left a region, this is detected by the presence detection apparatus, and the corresponding luminaire or emergency luminaire can be switched off again or at least dimmed.

In connection with the various reflection regions it should also be noted that for instance the reflection region of the detection radiation can thereby be configured as part of the reflection apparatus such that the corresponding detection region is arranged at another angle relative to the luminaire than the illumination region, and outside and without covering of the illumination region or is smaller or larger than the illumination region. Further relative arrangements and size ratios of the various regions are possible.

Figure 1:
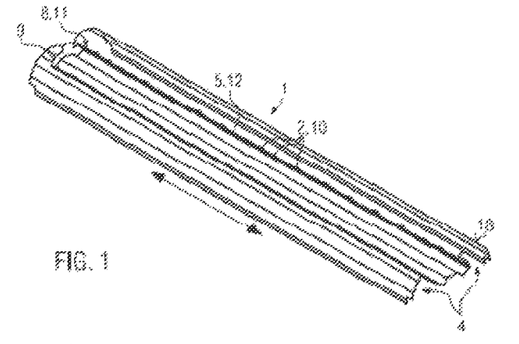
FIG. 1 shows a perspective view obliquely from below on an embodiment of a luminaire according to the invention.

FIG. 1 is a perspective view obliquely from below onto an embodiment of a luminaire 1 according to the invention. This luminaire is substantially designed as a linear luminaire and comprises a plurality of illuminants 2 along its luminaire length direction 14. These are designed in the illustrated embodiment as light-emitting diodes, LEDs 10. These are arranged on a carrier 8 in the form of an LED printed circuit board 11. This board extends in strip form in luminaire length direction 14. The corresponding light output of the LEDs 10 takes place in the direction of a reflection apparatus 4 which is configured in symmetry at both sides with respect to the luminaire length direction 14. The reflection apparatus 4 extends approximately in wing form from a top side of the luminaire 1 downwards in the direction of light output, wherein light emitted by the illuminants 2 is deflected towards an illumination region 3; see also FIG. 2.

Figure 2:
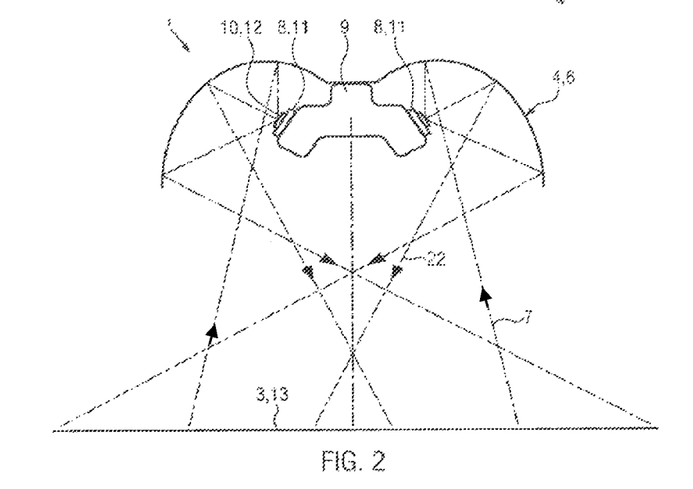
FIG. 2 shows a cross section through the luminaire according to FIG. 1.

The LED printed circuit boards 11 are arranged at both sides on a top side of a heat sink 9, see also FIG. 2, also with the option that the heat sink is made integral with the corresponding carrier 8.

A presence detection apparatus 5 is also arranged in the form of one, two or more presence sensors 12 on the LED printed circuit board 11. Such a presence sensor 12 is for instance an infrared sensor for detecting the presence or movement of a person in particular in the illumination region 3.

FIG. 2 shows a cross section through the luminaire 1 according to FIG. 1. It is particularly evident that the luminaire is configured in symmetry with the luminaire length direction 14. The corresponding reflection apparatus 4 is a detection-radiation reflection apparatus 6 at the same time, so that light emitted by the illuminants 2 and the LEDs 10, respectively, is deflected in the direction of the illumination region 3 and is also deflected by a detection radiation 7 emitted by a person moving in the illumination region 3 in the direction of the presence detection apparatus 5 and the presence sensor 12, respectively. The LEDs 10 and also the presence sensors 12 are arranged on the LED printed circuit board 11. Such a printed circuit board is arranged at both sides of the heat sink 9, wherein a direct light output of the illuminants 2 in the direction of the illumination region 3 is prevented by arrangement and course of the reflection apparatus 4.

The heat sink 9 is also configured in symmetry with the luminaire length direction 14.

Figure 3:
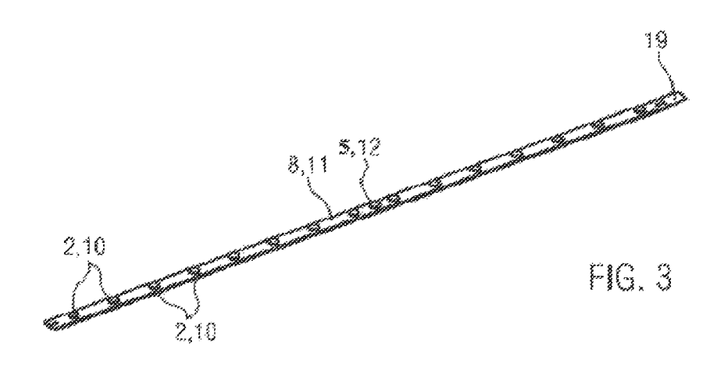
FIG. 3 shows an embodiment for an LED printed circuit board as a carrier for illuminants.
Figure 4:
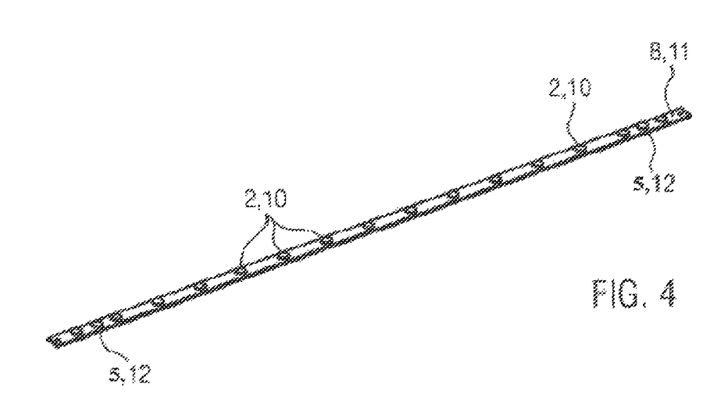
FIG. 4 shows a further embodiment for an LED printed circuit board according to FIG. 3.

FIGS. 3 and 4 show two embodiments for LED printed circuit boards 11. These comprise LEDs 10 each arranged spaced-apart from one another. Presence sensors 12 are arranged between them at some places. In the embodiment according to FIG. 3 a presence sensor 12 is arranged approximately centrally relative to the LED printed circuit board 11. In principle, FIG. 3 also shows an electronic evaluation unit 19 for the presence sensor 12 at an end of the LED printed circuit board 11. This electronic unit may also be arranged on the invisible rear side of the printed circuit board 11 as part of the corresponding supply electronics for the LEDs. Furthermore, the electronic evaluation unit 19 may be formed of parts of the luminaire electronics, which is not shown in the figures for the purpose of simplification.

In the embodiment according to FIG. 4 corresponding presence sensors 12 are arranged adjacent to the longitudinal ends of the printed circuit board 11.

Further arrangements and numbers of presence sensors 12 are also possible.

Since according to the invention the reflection apparatus 4 is also used as the detection-radiation reflection apparatus 6, the reflection apparatus 4 is configured and arranged such that the LEDs 10 and also the presence sensors 12 are substantially arranged at the focal point.

Figure 5:
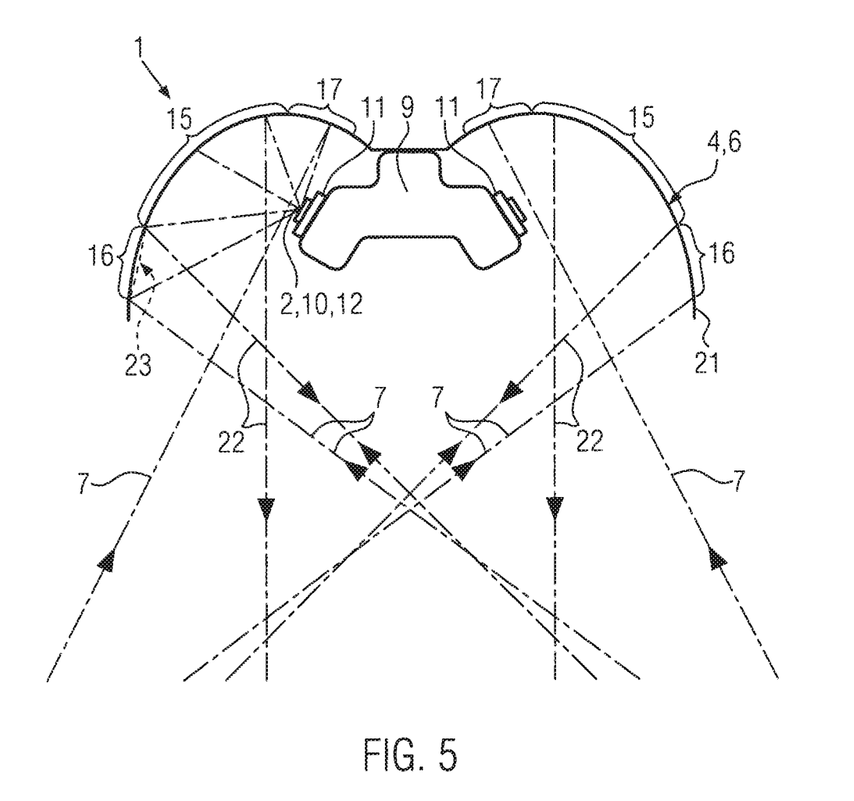
FIG. 5 shows a cross section by analogy with FIG. 2 through another embodiment of a luminaire according to the invention.

FIG. 5 shows a cross section by analogy with FIG. 2 through a further embodiment of a luminaire 1 according to the invention.

This embodiment differs from the one according to FIG. 2 by different regions of the reflection apparatus 4, see reflection region 15 for light reflection and reflection regions 16 and 17 mainly for the reflection of the detection radiation 7. However, there is also the possibility that the light radiation is also reflected in the reflection regions 16 and 17.

The reflection regions 16, 17 differ particularly from the reflection region 15 by a dichroic coating 23, which is shown in FIG. 5 at least for the reflection region 16.

Figure 6:
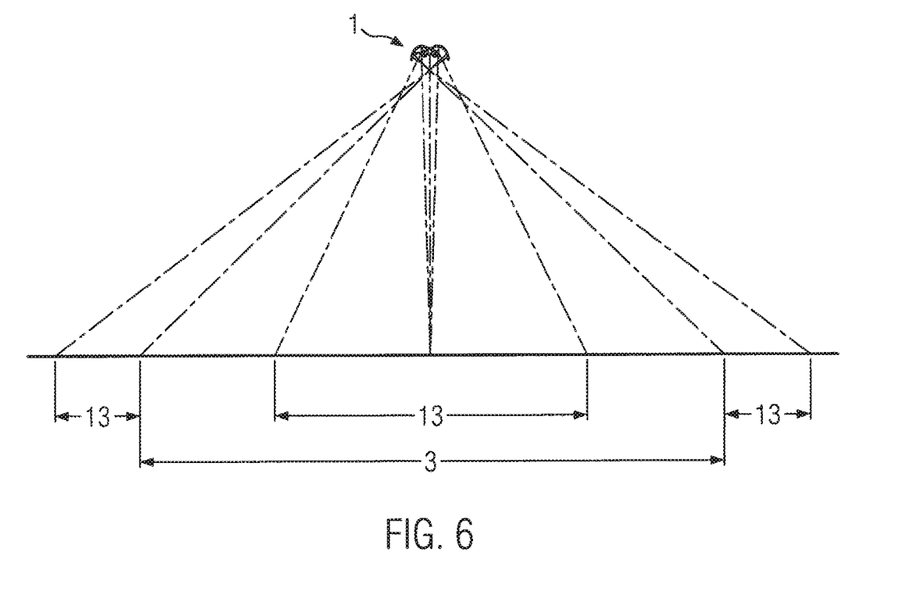
FIG. 6 shows illumination regions and detection regions of a luminaire according to FIG. 5.

The arrangement of various reflection regions 15, 16, 17 also yields specific arrangements of illumination region 3 and corresponding detection sensing regions 13, see FIG. 6. For instance, a detection sensing region 13 is located centrally below the luminaire 1, see FIG. 6, and approximately in the center in the illumination region 3. This region extends laterally according to FIG. 6 beyond the middle detection sensing region 13 and is bounded at its ends by further detection sensing regions 13. These follow from the reflection regions 16, see FIG. 5, wherein the middle detection sensing region 13 according to FIG. 6 follows from the reflection regions 17.

Moreover, the structure of the luminaire according to FIG. 6 is by analogy with that according to FIG. 2, and reference is made to the description of FIGS. 1 and 2 for further details of the luminaire.

Moreover, the corresponding light radiation 22 and detection radiation 7, respectively, are shown in FIGS. 2 and 5. In FIG. 2, the detection radiation 7 extends substantially in inverse direction to the light radiation 22. This is also substantially true for FIG. 5, where, however, different reflection regions 15, 16, 17 for light radiation 22 and deflection radiation 7 are formed in the area of the reflection apparatus 4. This means that the reflection region 15 of the reflection apparatus 4 serves to deflect the light radiation 22, whereas the reflection regions 16 and 17 correspond substantially to the detection-radiation reflection apparatus 6 that is part of the reflection apparatus 4. This is particularly distinguished (see above explanations) by the dichroic coating 23.

In the embodiment according to FIG. 5 there is also a symmetrical structure relative to the luminaire length direction 14.

Moreover, FIG. 5 shows an ambient light sensor 21. This sensor is exemplarily arranged on an outside of the reflection apparatus 4 at the lower end thereof. It is also possible to arrange the ambient light sensor 21 on an inside of the reflection apparatus 4, on the heat sink 9 or also at another place of a luminaire housing 18 or also outside the luminaire 1. The ambient light sensor 21 serves, for instance in the case of sufficient ambient light brightness, to switch off the luminaire or at least to reduce its light output, i.e. to dim it.

The control by the ambient light sensor 21 can for instance be canceled by the presence detection apparatus 5 if for instance in case of a dimmed light output of the luminaire 1 by way of the ambient light sensor 21 a person enters the illumination region 3 of the luminaire 1 and a raised illumination level is required. The presence of the person is detected by the presence detection apparatus 5 and can in this case lead to an increase in the light output. By analogy, when the person steps out of the illumination region 3, this can be detected by the presence detection apparatus 5, so that for instance the illumination level that was predetermined by the ambient light sensor 21 is adopted again.

If the ambient brightness is low, e.g. at night, this is also sensed by the ambient light sensor 21 and leads to an increased light output, i.e. enhanced brightness of the corresponding luminaire. However, if no person is present in the illumination region 3, the illumination level can be lowered, which is possible by way of the presence detection apparatus 5. Moreover, the life of the corresponding illuminants is prolonged by such a reduction of the illumination level especially in the case of LEDs. Of course, the energy consumption is also reduced in this case.

The various reflection regions 15, 16 and 17 can also be arranged such that for instance a detection of the detection radiation 7 is carried out at a greater angle than the illumination by way of light radiation by the luminaire 1. Moreover, detection region and illumination region may differ from each other in size, so that for instance the detection region is larger than the illumination region, or vice versa.

Figure 7:
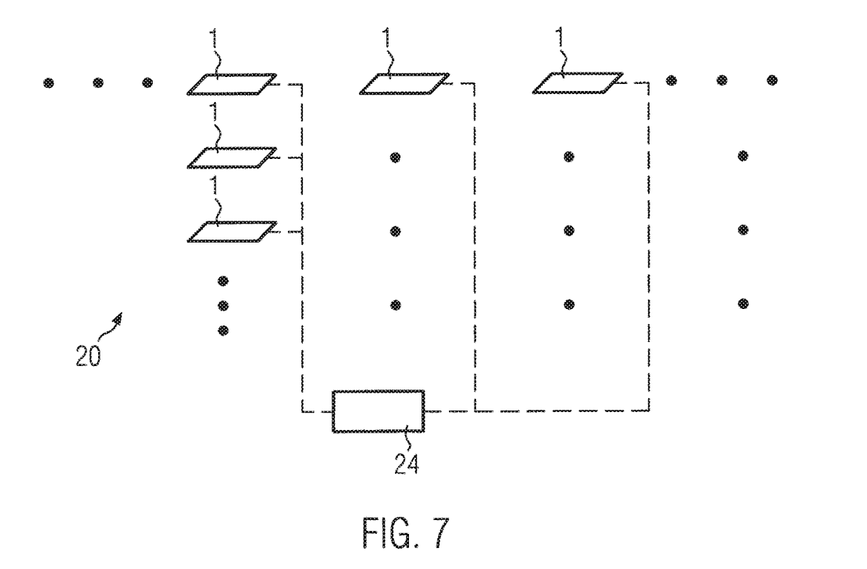
FIG. 7 shows a schematic diagram of an emergency lighting system, in particular, with a plurality of luminaires.

FIG. 7 shows a schematic diagram of an emergency lighting system 20 with a plurality of emergency luminaires as luminaires 1. These are for instance connected to a central control device 24. Such an emergency lighting system 20 serves, in particular in case of failure of an external energy supply, to operate the corresponding emergency luminaires via a battery system. Furthermore, the emergency luminaires may serve to guide persons towards an emergency exit, or the like. In this connection the presence detection apparatus 5 of each luminaire 1 can be used to illuminate regions located for instance in movement direction ahead of the person with enhanced brightness or in general, whereas regions located in movement direction behind the person are illuminated with less brightness or are not illuminated any more. This also guides a person along a path because this person is always guided in the direction of the brighter illumination region. Moreover, with the help of the central control device 24 the luminaires 1 can be controlled such that the route ahead of the person is illuminated for instance by way of several luminaires and their illumination regions 3 and the luminaire is dimmed or switched off by way of the presence detection apparatus 5 after the corresponding region has been left.

The invention claimed is:

1. A luminaire comprising:
    illuminants; and
    a reflection apparatus that comprises:
        a first portion that is configured for deflecting light radiation emitted by the illuminants into an illumination region, wherein a presence detection apparatus is assigned to the luminaire and disposed adjacent to the illuminants, and
        a second portion that is embodied as a detection-radiation reflection apparatus and configured to deflect electromagnetic detection radiation in the direction of the presence detection apparatus.

2. The luminaire according to claim 1, wherein the illuminants and the presence detection apparatus are arranged together on a carrier.

3. The luminaire according to claim 2, wherein the carrier is configured as a heat sink or is arranged on a heat sink.

4. The luminaire according to claim 2, wherein the carrier extends in strip form in a direction along a length of the luminaire.

5. The luminaire according to claim 2, wherein the illuminants are LEDs (10) and the carrier is an LED printed circuit board.

6. The luminaire according to claim 5, wherein the presence detection apparatus is embodied on the LED printed circuit board in a form of one, two, or more presence sensors.

7. The luminaire according to claim 1, wherein a detection sensing region (13) from which the electromagnetic detection radiation is deflectable with the help of the detection-radiation reflection apparatus towards the presence detection apparatus corresponds to the illumination region.

8. The luminaire according to claim 1, wherein the luminaire is of a symmetrical structure with respect to a direction along a length of the luminaire.

9. The luminaire according to claim 1, wherein the first region of the reflection apparatus is shaped differently from the second region of the reflection apparatus.

10. The luminaire according to claim 9, wherein at least the second region of the reflection apparatus comprises a dichroic coating.

11. The luminaire according to claim 1, wherein the electromagnetic detection radiation (7) is infrared radiation.

12. The luminaire according to claim 1, wherein the reflection apparatus is arranged within a luminaire housing or forms at least a part of the luminaire housing.

13. The luminaire according to claim 5, wherein an electronic evaluation unit of the presence detection apparatus is arranged on the LED printed circuit board or is part of electronics of the luminaire.

14. The luminaire according to claim 1, wherein the luminaire is an emergency luminaire of an emergency lighting system.

15. The luminaire according to claim 1, wherein an ambient light sensor is assigned to the luminaire.

16. A method for presence detection comprising:
receiving, at a presence detection apparatus, electromagnetic detection radiation that is deflected by a reflection apparatus of a luminaire,
   wherein the luminaire comprises a number of illuminants and the reflection apparatus, and
   wherein the reflection apparatus comprises a first region that is configured to deflect light radiation emitted by the illuminants into an illumination region, and a second region that is embodied as a detection-radiation reflection apparatus and is configured to deflect electromagnetic detection radiation in the direction of the presence detection apparatus,
   wherein the presence detection apparatus is assigned to the luminaire; and
evaluating the electromagnetic detection radiation to detect a presence and/or a movement of at least one person.

17. The method according to claim 16, wherein a light output of the luminaire is controlled in response to the electromagnetic detection radiation detected by the presence detection apparatus.

18. The method according to claim 17, wherein the luminaire is connected to another luminaire and a central control device (24) for presence detection and control of the light output.

19. The method according to claim 17, wherein the light output of the luminaire is additionally controlled in response to an ambient light sensor.

20. The method according to claim 18, wherein the light output of the luminaire and the other luminaire is controlled in response to a detected direction of movement of the at least one person.

* * * * *